Aug. 9, 1955  C. GRIFFON  2,714,723
HYDROPNEUMATIC FLUSHING CONTAINERS FOR WATER-CLOSETS
AND THE LIKE APPLICATIONS
Filed Aug. 5, 1954  2 Sheets-Sheet 1

Inventor:
Claudius Griffon
by: J. Delattre Seguy
Attorney

Aug. 9, 1955 C. GRIFFON 2,714,723
HYDROPNEUMATIC FLUSHING CONTAINERS FOR WATER-CLOSETS
AND THE LIKE APPLICATIONS
Filed Aug. 5, 1954 2 Sheets-Sheet 2
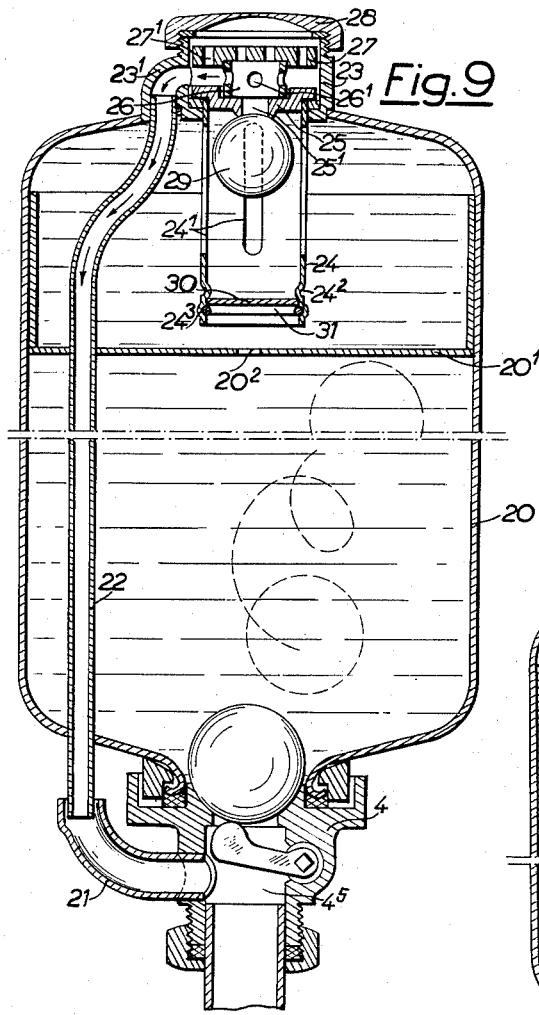
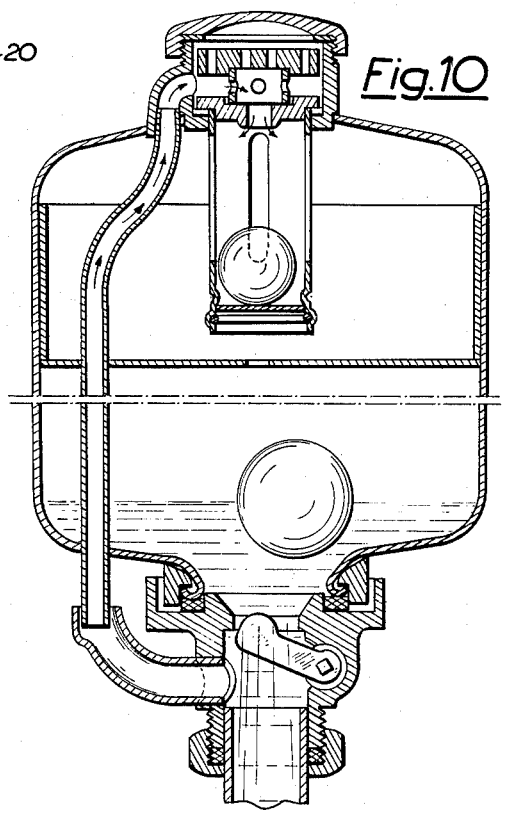
Inventor:
Claudius Griffon
by: J. Delater Syry
Attorney

United States Patent Office 2,714,723
Patented Aug. 9, 1955

2,714,723

HYDROPNEUMATIC FLUSHING CONTAINERS FOR WATER-CLOSETS AND THE LIKE APPLICATIONS

Claudius Griffon, Saint-Etienne, France

Application February 5, 1954, Serial No. 408,567

Claims priority, application France February 20, 1953

6 Claims. (Cl. 4—26)

My invention has for its object improvements in hydropneumatic flushing tanks, wherein the flushing tank includes preferably a single compartment fed with water through a water-feeding pipe. The water accumulates inside the tank and compresses the air at the upper end of said tank. The latter is open at its lower end and its opening is closed by a valve ball during the filling stage. A control system acts underneath the valve ball so as to raise it and to produce the flushing by releasing the water submitted to pressure inside the tank.

This structure and its operation are very simple, but this theoretical simplicity is not sufficient for the execution of a system adapted for practical operation. Such an arrangement requires, as a matter of fact, the solution of numerous problems relating e. g. to the adjustment of the water throughout, to the intake of air into the tank, to the control of the raising of the valve ball, taking into account the considerable pressure exerted on said ball, to means for preventing any seeping of water outwardly, to the mounting of the different parts and in particular of the water guiding means, to the adjustment of the output of the flushing means, etc.

The arrangement forming the object of my present invention solves these different problems in a very simple manner and is capable of ensuring a very long service with a minimum upkeep cost. By reason of the simplicity of the arrangement, the owner himself may adjust it and replace any part thereof when required.

According to my invention, the control members are fluidtightly mounted at the lower end of the container which is provided along its axial opening with a collar engaging the bearing surface of a ring secured by screws inside the cup-shaped member formed at the upper end of the valve body connected with the outlet pipe and forming the seat of the ball valve.

I have illustrated by way of example in accompanying drawings a preferred embodiment of my invention. In said drawings:

Figs. 9 and 10 illustrate a second embodiment of the tank in two successive stages of operation.

Figure 1:
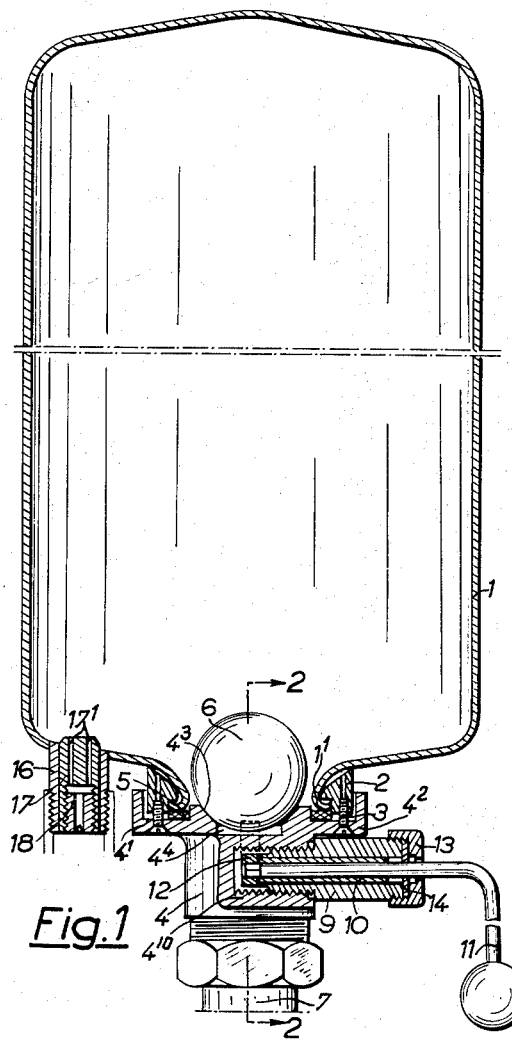
Fig. 1 is a general vertical sectional view of a flushing container according to my invention.

According to my invention, the actual container or tank 1 assumes a cylindrical shape in the example illustrated in Fig. 1. The container 1 may include several sections, fluidtightly connected through welding for instance. Its upper section forms an upwardly convex cap while its bottom is frusto-conical and slopes downwardly towards the axial opening of the tank, the edge $1^1$ of which is turned up outwardly and forms a collar engaging the inner circular bearing surface of a ring 2 which is secured by screws 3 inside the cup-shaped member $4^1$ formed by a recess in the upper end $4^2$ of the valve body 4.

A washer or packing 5 is housed inside the bearing surface of the ring 2 and over the surface of the cup-shaped member $4^1$. Said washer is held fast through its four surfaces upon locking of the ring 2 by the screws 3, while there remains a certain clearance between the cup-shaped member $4^1$ and the ring 2 on the outside of the washer.

The valve body 4 is provided along the axis of the tank with a frustoconical bearing surface $4^3$ on which may rest the valve ball 6. The frustoconical bearing surface $4^3$ opens into an axial passage $4^4$ extending into a drain $4^5$ of a larger diameter inside which is fitted and held fast the pipe 7 serving for the exhaust of water, a packing and a nut holding said pipe 7 in position.

Figure 2:
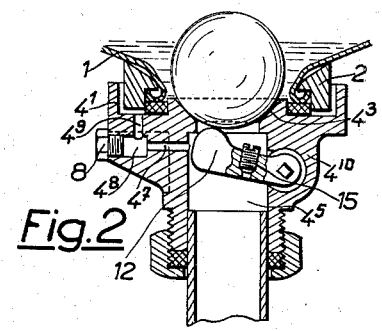
Figs. 2, 3 and 4 are axial cross-sections of the water outflow system, through line 2—2 of Fig. 1, for different stages of control and operation of the flushing device.

The valve body 4 is also provided with a vertical rib $4^6$ inside which is formed a small opening $4^7$ communicating with the drain $4^5$ (Fig. 2). The outer end of the opening $4^7$ communicates with a chamber $4^8$ of a larger diameter the outer end of which is tapped and closed by a screw 8. The inner smooth section of the chamber 8 communicates through a small lateral vertical passage $4^9$ with the surface of the cup-shaped member $4^1$.

The valve body 4 is provided also laterally (Fig. 1) with a boss $4^{10}$ which is bored and tapped so as to be engaged by the inner threaded end of a sleeve 9. Inside said sleeve is revolubly carried, with the interposition of a tubular sheath 10, the rod 11 terminating a control lever and the inner end of which carries, through a square section, for instance, as illustrated, a shaped tappet or push member 12. The tubular sheath 10 is welded or otherwise secured to the rod 11 of the lever.

The sleeve 9 assumes a slight slope inside the boss $4^{10}$ inside which it is screwed, whereby the droplets of water which might seep out along the surface of the tubular sheath 10, are returned by gravity inside the body 4. Furthermore, the tubular sheath 10 is slightly shorter than the sleeve 9, whereby a chamber is formed at the outer end of the sleeve inside which chamber any droplets of water which have found their way into it, are stopped.

In addition to this arrangement, a plug 13 is screwed over the end of the sleeve. Said plug is provided with a recess in its central inner surface so as to clamp only through its outer periphery, the outer end of the sleeve with the interposition of a rubber washer 14 the axial opening in which has a diameter slightly less than that of the rod 11 so as to engage said rod with a force fit. Thus, no droplets of water can filter to the outside of the sleeve.

Figure 3:
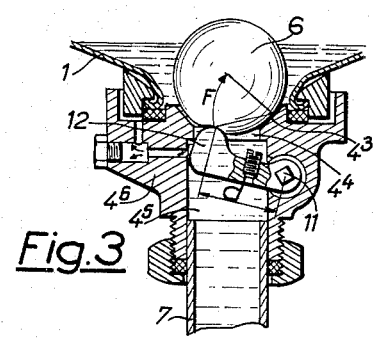
Figure 4:
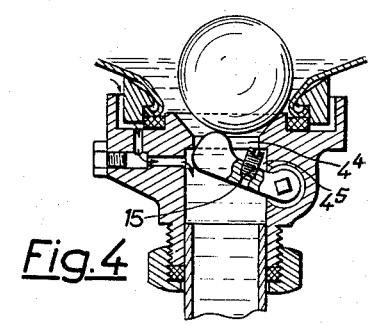

The tappet or push member 12 is shaped as illustrated in Figs. 2, 3 and 4. The bore in the boss $4^{10}$ allows introducing said tappet into the valve body 4 inside which it is adapted to rock freely in the axial passage $4^4$ leading to the seat and in the drain $4^5$, round the axis of the sheath 10 and of the lever rod 11.

This embodiment of the control system for the flushing means is of considerable interest insofar that the push member 12 engages the valve ball 6 no longer along the axis of the seat $4^3$ but in a highly eccentric manner with reference to said axis, in proximity with the bearing area between the valve ball and the seat (Fig. 2).

When the rod 11 of the control lever is rocked, the push member acts with a lever arm $d$ (Fig. 3) on a point in the immediately vicinity of the seat $4^3$; in spite of the considerable pressure urging the ball onto its seat, it is an easy matter to release the ball through one point so as to make it rock in the direction of the arrow F (Fig. 3) while bearing on the diametrically opposed area of the seat $4^3$. The pressure of the water passing between the ball and the seat releases then completely the ball with reference to its seat without any noticeable stress being exerted (Fig. 4).

This arrangement operates in a particularly rational manner on the valve ball so as to release it from its seat, in contradistinction with numerous known systems wherein the stress is exerted axially underneath the ball, which implies a considerable thrust and a sometimes delayed release. Consequently the operation of the system is not always practical and its parts, in particular the ball, are easily damaged.

In the flushing system described, the wall, after it has been raised off its seat, remains near the exhaust port and it is necessary to hold it in a raised position through the tappet 12 throughout the flushing period, as provided by actuating the control lever 11. The output and energy of flushing depend, however, on the breadth of the passage provided between the ball and the seat. To hold the ball more or less raised, a screw 15 is screwed into the thickness of the tappet 12 at a location such that said screw forms an adjustable abutment with reference to the circular edge of a bearing provided inside the valve body between the axial passage $4^4$ and the drain $4^5$. It is thus possible to adjust, in accordance with the water pressure in the mains feeding the flushing tank, the amplitude of the pivotal movement of the tappet 12 and consequently the extent of the movement of the valve ball 6 above its seat.

During the different stages of the flushing operation, water will enter at a high speed the drain $4^5$ and a small amount will pass into the opening $4^7$ to form a jet which is broken inside the small chamber $4^8$, as illustrated by the arrows in Fig. 3. The continuation of the flushing produces a suction on the water which has entered the opening $4^7$ and the chamber $4^8$ and then a suction of air into the valve body 4, as shown by the arrows in Fig. 4, said air being sucked in through the channel $4^9$ connecting the chamber $4^8$ with the surface of the cup-shaped member $4^1$ and through the clearance between said cup-shaped member and the ring 2. Said admission of air prevents any jerky movement and shocks of the ball on its seat at the end of the flushing operation and also all ramming effects in the pipes.

At the lower end of the tank 1 is located an arrangement for adjusting the admission of water (Fig. 1). This arrangement includes a connection 16 welded or suitably secured in any other manner to the lower end of the tank. Inside said connection 16 is welded or suitably secured, removably or otherwise, a cylindrical member 17 provided symmetrically with reference to its axis with two longitudinal channels $17^1$ of a reduced diameter extending over the inner portion of its length. The cylindrical member 17 is provided over the outer portion of its length with a threaded bore opening into the rear ends of the channel $17^1$ and inside which is screwed a screw 18 also provided with an axial bore. It is apparent that through a modification in the axial position of the screw 18 as obtained by a screwing or unscrewing thereof, the throughput of water through the channels $17^1$ towards the inside of the tank is increased or decreased. For an extreme location, for which the screw 18 reaches the bottom of the bore in the member 17, the water can no longer enter the tank. The water admission pipe shown in interrupted lines in Fig. 1 opens into the connection 16.

Figure 5:
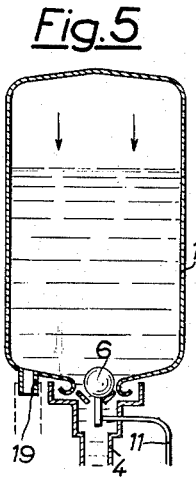
Figs. 5, 6, 7 and 8 illustrate diagrammatically the particular arrangement provided for the input of water, whereby it is possible to automatically drain the tank from time to time, while a compensating admission of air enters the tank.
Figure 6:
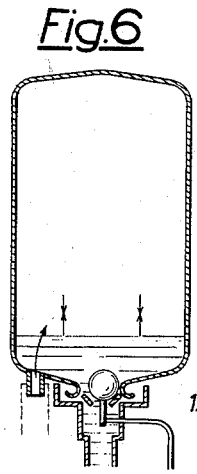
Figure 7:
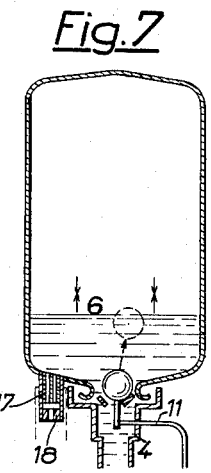
Figure 8:
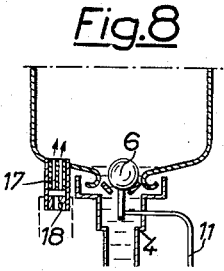

The interest of this arrangement is fully apparent from examination of the diagrams in Figs. 6, 7 and 8. In Figs. 5 and 6, water is fed through a standard connection 19 having a high cross-sectional area adapted for large throughputs. After a number of operations, a portion of the air contained inside the tank is removed by the successive flushings and consequently there arrives a moment at which, already before the end of the exhaust stage, the air cushion exerts no longer any pressure on the water and, on the contrary, a lower pressure is formed (Fig. 6) whereby water enters energetically inside the tank through the connection 16, as shown by the arrows, before the tank has been completely emptied of its water.

The amount of water that has not been drained builds up gradually so that it is necessary to drain the tank by stopping the admission of water while holding the ball valve raised, whereby the water is exhausted without any pressure being exerted thereon while a compensating admission of air is provided.

With the admission means described, the desired draining is performed automatically. As a matter of fact, the admission of water is reduced and adjusted in conformity with the pressure of the inflowing water, and the water is drained quicker without its draining being complete. However, when a certain amount of water has collected inside the tank (Fig. 7) without any pressure being exerted thereon, the person operating the flushing system will notice how little water is now urged out under pressure so that he will certainly and almost mechanically actuate the control lever 11 again. This reduces the pressure inside the tank. The valve ball is raised up to the free level of the water by an upwardly directed force, as illustrated in interrupted lines in Fig. 7; consequently, the water, which is submitted to no pressure is exhausted automatically while a compensating admission of air is provided through the drain $4^5$ and the passage $4^4$ (Fig. 8). The input of water which is suitably adjusted through the arrangement does not disturb this draining of the container and, at the end of the draining, the ball returns into its position on the seat $4^3$.

In a modified embodiment illustrated in Figs. 9 and 10, the actual tank 20 is provided with an inner horizontal partition $20^1$ forming an upper compartment of a size smaller than the lower compartment. An axial opening $20^2$ in the partition $20^1$ connects the two compartments of the tank with each other.

The members controlling the flushing operation at the lower end of the tank are designed as precedingly, except for the intake of air inside the valve body 4 through the passageways $4^7$, $4^8$ and $4^9$. The push member or tappet 12 does not carry any abutment screw such as 15 for limiting the amplitude of its pivotal movement.

On the other hand, a bent channel 21 opens inside the valve body 4 into the draining pipe $4^5$. A tube 22, one end of which engages the bent channel 21 connects the inside of the valve body 4 with an automatic closing means mounted at the upper end of the tank.

The tube 22 passes through the bottom of the tank and through the partition $20^1$ and opens into the bent exhaust pipe $23^1$ associated with a cylinder 23 welded or otherwise secured to the upper end of the tank. A cylindrical sheath 24 is secured to the lower end of the cylinder 23 and is closed at its upper end by a cover 25 housed inside said cylinder 23. The cover 25 rests over a lower bearing surface formed inside said cylinder with the interposition of a packing.

A ring 26 provided with peripheral ports $26^1$ is mounted between the cover 25 and a second cover 27 and is centrally held inside recesses formed in said covers. The second cover 27 is provided with inspection holes $27^1$.

A plug 28 is screwed over the upper end of the cylinder 23 with the interposition of a packing adapted to fluidtightly close said cylinder.

Inside the cylindrical sheath 24 is positioned a rubber ball 29 the object of which is to close the axial opening $25^1$ in the cover 25. An annular boss surrounding the opening $25^1$ forms a seat for said ball 29.

The sheath 24 is provided with longitudinal slots $24^1$ opening into the upper compartment. The lower end of the sheath lies in proximity with the partition $20^1$ and it is closed by a solid washer 30 engaging a circular bead $24^2$ formed by an inward deformation of the sheath metal. An elastic ring 31 housed inside a second angular bead $24^3$ projecting outwardly, holds the washer 30 in position.

The arrangement disclosed causes the water entering the tank through the feeding means which have not been illustrated in Figs. 8 and 9, to fill the lower compartment and urge the air upwardly, and then to enter the upper compartment through the port $20^2$. The washer 30 prevents the jet of water under pressure from acting directly on the ball 29.

As the upper compartment is being filled, the ball 29 rises inside the sheath 24 and the air is urged through the tube 22 until the ball 29, submitted to water pressure, closes the cooperating axial opening 25¹. In the case of a small amount of water escaping through the opening 25¹, this would not lead to any leak outwardly of the flushing system since the water would flow through the tube 22 back to the valve body 24 as shown by the arrows in Fig. 9.

When the flushing system is operated, the valve ball rises up to the partition 20¹ under the action of the turbulent water eddies produced by the passage of the water through the port 20². The expulsion of the water is by no means braked since the upper ball 29 has released the opening 25¹ and there is provided thus a compensating admission of air into the upper end of the container, as shown by the arrows in Fig. 10.

This last described arrangement produces a large volume of flushing water.

It will be understood that, in the embodiments of Figures 9 and 10, the partition 20¹ serves to divide the tank into two compartments, and in turn, to limit the upwards displacement of the valve ball 6, thereby avoiding that said valve ball 6 should become stuck at the upper part of the tank. On the other hand, the restricted orifice 20² in partition 20¹ serves to prevent too strong and too rapid a filling of the upper compartment, which permits a progressive and complete evacuation of the air through opening 25¹; this avoids the pocketing of air in the upper part of the upper compartment, which would then impair the operation of the flushing parts at the time of the evacuation. Then, at the time of the evacuation, restricted orifice 20² serves to prevent that the whole body of water in the entire tank should exert too brutal a pushing rush of evacuation.

My improved flushing tank, different embodiments of which have been described, ensures a satisfactory and uniform operation while removing the drawback of all prior known systems. Obviously and as apparent from the preceding disclosure, my invention is by no means limited to the embodiments and applications and to the structure of the different component parts which have been more particularly disclosed; it covers in fact all the modification thereof falling within the scope of accompanying claims.

What I claim is:

1. In a hydropneumatic flushing system, the combination of a tank provided with an axial opening at its lower end, the edge of the tank surrounding said axial opening terminating in the shape of an outwardly directed collar, a ring surrounding said opening and fitted inside said collar, a valve body fitted inside said opening and including an outwardly directed flange forming an upwardly facing dish-shaped member engaging the lower and outer surfaces of the ring with a slight clearance with reference thereto, said valve body being provided with an axial drain the upper end of which facing the inside of the tank forms a valve seat, a valve ball normally engaging the valve seat, screws securing said ring to the bottom of said dish-shaped member, a packing fitted inside the inner annular section of the dish-shaped member in contacting relationship with the outwardly directed collar surrounding the opening of the tank and with the outer surface of the ring, a radial boss rigid with the valve body and provided with a tapping directed slightly upwardly towards its outer end, a sleeve adapted to be screwed inside said tapping, a tubular lining fitted inside the sleeve, a bent control rod the inner section of which is revolubly held inside and axially of said lining, and a tappet rigid with the inner end of the inner section of the bent rod and adapted to revolve round the axis of the sleeve and lining inside the drain in the valve body, to engage for a predetermined angular position a point of the valve ball located eccentrically with reference to the axis of the seat.

2. In a hydropneumatic flushing system, the combination of a tank provided with an axial opening at its lower end, the edge of the tank surrounding said axial opening terminating in the shape of an outwardly directed collar, a ring surrounding said opening and fitted inside said collar, a valve body fitted inside said opening and including an outwardly directed flange forming an upwardly facing dish-shaped member engaging the lower and outer surfaces of the ring with a slight clearance with reference thereto, said valve body being provided with an axial drain the upper end of which facing the inside of the tank forms a valve seat, a valve ball normally engaging the valve seat, screws securing said ring to the bottom of said dish-shaped member, a packing fitted inside the inner annular section of the dish-shaped member in contacting relationship with the outwardly directed collar surrounding the opening of the tank and with the outer surface of the ring, a radial boss rigid with the valve body and provided with a tapping directed slightly upwardly towards its outer end, a sleeve adapted to be screwed inside said tapping, a tubular lining fitted inside the sleeve, the outer end of the lining stopping short of the outer end of the sleeve so as to form a small chamber, a yielding washer fitted tightly over the part of the control rod which registers with the outer end of the sleeve, a bent control rod the inner section of which is revolubly held inside and axially of said lining, a tappet rigid with the inner end of the inner section of the bent rod and adapted to revolve round the axis of the sleeve and lining inside the drain in the valve body, to engage for a predetermined angular position a point of the valve ball located eccentrically with reference to the axis of the seat and means through which air is sucked from the atmosphere into the drain by the flushing of the tank through said drain, as provided by the raising of the valve ball by the tappet for flushing.

3. In a hydropneumatic flushing system, the combination of a tank provided with an axial opening at its lower end, the edge of the tank surrounding said axial opening terminating in the shape of an outwardly directed collar, a ring surrounding said opening and fitted inside said collar, a valve body fitted inside said opening and including an outwardly directed flange forming an upwardly facing dish-shaped member engaging the lower and outer surfaces of the ring with a slight clearance with reference thereto, said valve body being provided with an axial drain the upper end of which facing the inside of the tank forms a valve seat, a valve ball normally engaging the valve seat, screws securing said ring to the bottom of said dish-shaped member, a packing fitted inside the inner annular section of the dish-shaped member in contacting relationship with the outwardly directed collar surrounding the opening of the tank and with the outer surface of the ring, a radial boss rigid with the valve body and provided with a tapping directed slightly upwardly towards its outer end, a sleeve adapted to be screwed inside said tapping, a tubular lining fitted inside the sleeve, a bent control rod the inner section of which is revolubly held inside and axially of said lining, a tappet rigid with the inner end of the inner section of the bent rod and adapted to revolve round the axis of the sleeve and lining inside the drain in the valve body, to engage for a predetermined angular position a point of the valve ball located eccentrically with reference to the axis of the seat, means for feeding water into the tank comprising a connection opening into the lower end of the tank and rigid therewith, a water-feeding pipe opening into said connection, a cylindrical member fitted inside said connection and the upper section of which is provided with a plurality of longitudinal perforations extending in parallelism with and symmetrically of the axis of said cylindrical member and the lower section of which cylindrical member is provided with a tapped bore opening into the different perforations and a longitudinally bored screw adjustably screwed into the tapped bore of the cylindrical member to adjust the throughput of water through said bore and perforations of the cylindrical member.

4. In a hydropneumatic flushing system, the combination of a tank provided with an axial opening at its lower end, the edge of the tank surrounding said axial opening terminating in the shape of an outwardly directed collar, a ring surrounding said opening and fitted inside said collar, a valve body fitted inside said opening and including an outwardly directed flange forming an upwardly facing dish-shaped member engaging the lower and outer surfaces of the ring with a slight clearance with reference thereto, said valve body being provided with an axial drain the upper end of which facing the inside of the tank forms a valve seat and including further an outer substantially vertical rib provided with a radial channel opening into the axial drain in the valve body and with a channel of a larger diameter connecting the outer end of the first channel with the outside of the valve body and the outer end of which is tapped, a further channel being provided vertically between the second channel and the upper surface of the dish-shaped member, a screw fitted inside the tapping of the larger diameter channel, the succession of the three above mentioned channels providing an auxiliary passage for atmospheric air into the axial drain in the valve body, a valve ball normally engaging the valve seat, screws securing said ring to the bottom of said dish-shaped member, a packing fitted inside the inner annular section of the dish-shaped member in contacting relationship with the outwardly directed collar surrounding the opening of the tank and with the outer surface of the ring, a radial boss rigid with the valve body and provided with a tapping directed slightly upwardly towards its outer end, a sleeve adapted to be screwed inside said tapping, a tubular lining fitted inside the sleeve, a bent control rod the inner section of which is revolubly held inside and axially of said lining, and a tappet rigid with the inner end of the inner section of the bent rod and adapted to revolve round the axis of the sleeve and lining inside the drain in the valve body, to engage for a predetermined angular position a point of the valve ball located eccentrically with reference to the axis of the seat.

5. In a hydropneumatic flushing system, the combination of a tank provided with an axial opening at its lower end, a valve body fitted inside said opening, said valve body being provided with an axial drain the upper end of which facing the inside of the tank forms a valve seat, a valve ball normally engaging the valve seat, a radial boss rigid with the valve body and provided with a tapping directed slightly upwardly towards its outer end, a sleeve adapted to be screwed inside said tapping, a tubular lining fitted inside the sleeve, a bent control rod the inner section of which is revolubly held inside and axially of said lining, a tappet rigid with the inner end of the inner section of the bent rod and adapted to revolve round the axis of the sleeve and lining inside the drain in the valve body, to engage for a predetermined angular position a point of the valve ball located eccentrically with reference to the axis of the seat, and a screw screwed into the surface of the tappet facing the valve ball and adapted to abut for a predetermined angular position of the tappet against the inner wall of the axial drain in the valve body.

6. In a hydropneumatic flushing system, the combination of a tank provided with an axial opening at its lower end, a valve body fitted inside said opening, said valve body being provided with an axial drain the upper end of which facing the inside of the tank forms a valve seat, a valve ball normally engaging the valve seat, a radial boss rigid with the valve body and provided with a tapping directed slightly upwardly towards its outer end, a sleeve adapted to be screwed inside said tapping, a tubular lining fitted inside the sleeve, a bent control rod the inner section of which is revolubly held inside and axially of said lining, a tappet rigid with the inner end of the inner section of the bent rod and adapted to revolve round the axis of the sleeve and lining inside the drain in the valve body, to engage for a predetermined angular position a point of the valve ball located eccentrically with reference to the axis of the seat, a partition provided with an axial opening and extending across the tank, a pipe connecting the drain in the valve body with a point registering with the upper end of the tank above the partition, a valve system carried by the upper end of the tank above the partition and including a perforated downwardly extending shell, a cover therefor provided with a central opening, an auxiliary valve ball housed inside the shell and adapted to be urged by the rising of the water above the partition into engagement with its seat formed by the edge of the central opening in the cover, and means whereby the said opening in the cover communicates with the upper end of the pipe, to provide selectively for the exhaust of air from the valve system back into the drain upon raising of the first valve ball by the tappet for flushing purposes and for the return of air into the upper end of the tank when the level of water has sunk and the auxiliary valve ball has dropped away from its seat.

No references cited.